United States Patent
Bank et al.

(10) Patent No.: US 11,460,086 B2
(45) Date of Patent: Oct. 4, 2022

(54) ACTIVE INERTIAL DAMPER SYSTEM AND METHOD

(71) Applicant: MECAL Intellectual Property and Standards B.V., Enschede (NL)

(72) Inventors: Servaas Louis Bank, Enschede (NL); Joannes Theodoor de Smit, Waalre (NL); Bernhard Michael Bakker, Eindhoven (NL); Ronald Gerardus Jozef Rijkers, Eersel (NL)

(73) Assignee: MECAL INTELLECTUAL PROPERTY AND STANDARDS B.V., Enschede (NL)

( * ) Notice: Subject to any disclaimer, the term of this patent is extended or adjusted under 35 U.S.C. 154(b) by 894 days.

(21) Appl. No.: 16/078,941

(22) PCT Filed: Feb. 24, 2017

(86) PCT No.: PCT/NL2017/050110
§ 371 (c)(1),
(2) Date: Aug. 22, 2018

(87) PCT Pub. No.: WO2017/146573
PCT Pub. Date: Aug. 31, 2017

(65) Prior Publication Data
US 2020/0224743 A1 Jul. 16, 2020

(30) Foreign Application Priority Data

Feb. 26, 2016 (NL) ...................................... 2016330

(51) Int. Cl.
*E04B 1/98* (2006.01)
*H02P 7/025* (2016.01)
(Continued)

(52) U.S. Cl.
CPC ......... *F16F 7/1005* (2013.01); *E04H 9/0215* (2020.05); *F16F 15/002* (2013.01);
(Continued)

(58) Field of Classification Search
CPC .... F16F 7/1005; F16F 15/002; F16F 2222/08; F16F 2230/18; H02P 7/025; E04H 9/0215
See application file for complete search history.

(56) References Cited

U.S. PATENT DOCUMENTS

| 5,447,001 A * | 9/1995 | Nishimura ................ E04H 9/14 52/167.2 |
| 2009/0153832 A1* | 6/2009 | Tatsuzaki ................ G03F 7/709 355/72 |

(Continued)

FOREIGN PATENT DOCUMENTS

| DE | 102006053232 A1 * | 5/2008 | ............ F16F 7/1005 |
| JP | 2008223282 | 9/2008 | |
| JP | 201174594 | 4/2011 | |
| WO | 2006106134 | 10/2006 | |

OTHER PUBLICATIONS

English machine translation of DE-102006053232 (Year: 2008).*

Primary Examiner — Melody M Burch
(74) Attorney, Agent, or Firm — Hoffmann and Baron, LLP

(57) ABSTRACT

An active inertial damper system (100) and method for damping vibrations (V1,V2) in a structure (11). An inertial mass (2) is supported by a support frame (1) via spring means (3) to form a mass-spring system (2,3) having a resonance frequency (fn). A controller (6) is configured to control a force actuator (4) to adapt the driving force (Fd) as a function of measured vibrations (V1,V2). The controller (6) comprises a filter (H) determining a magnitude (M) of the driving force (Fd) as a function of frequency (f) for the measured vibrations (V1,V2) in the structure (11). The filter (H) is configured to provide an anti-resonance dip in the (Continued)

magnitude (M) of the driving force (Fd) at the resonance frequency (fn) of the mass-spring system (2,3) to suppress resonant behaviour of the mass-spring system (2,3) itself.

20 Claims, 9 Drawing Sheets

(51) Int. Cl.
*F16F 7/10* (2006.01)
*E04H 9/02* (2006.01)
*F16F 15/00* (2006.01)

(52) U.S. Cl.
CPC .......... *H02P 7/025* (2016.02); *F16F 2222/08* (2013.01); *F16F 2228/04* (2013.01); *F16F 2230/18* (2013.01)

(56) References Cited

U.S. PATENT DOCUMENTS

| | | | |
|---|---|---|---|
| 2012/0017645 A1* | 1/2012 | Baron | D06F 39/125 68/12.02 |
| 2012/0045723 A1* | 2/2012 | Nawata | G03F 7/709 430/325 |
| 2013/0037687 A1 | 2/2013 | Furumoto et al. | |
| 2014/0156070 A1* | 6/2014 | Merry | B25J 9/1653 700/253 |
| 2015/0059345 A1* | 3/2015 | Hellat | F23M 20/005 60/725 |
| 2015/0142182 A1 | 5/2015 | Kimura et al. | |
| 2015/0153377 A1* | 6/2015 | Boisseau | G01C 9/00 324/244 |
| 2015/0153659 A1* | 6/2015 | Nawata | G03F 7/709 355/72 |
| 2015/0369330 A1* | 12/2015 | Nawata | F16F 15/022 355/72 |

* cited by examiner

ACTIVE INERTIAL DAMPER SYSTEM AND METHOD

This application claims priority from International Application No. PCT/NL2017/050110, filed on Feb. 24, 2017, which claims priority from Dutch patent application numbers NL2016330, filed on Feb. 26, 2016, all of which are incorporated herein in their entirety.

TECHNICAL FIELD AND BACKGROUND

The present disclosure relates to an active inertial damper system and method for damping vibrations in a structure.

For example, U.S. Pat. No. 5,884,736 describes an active vibration suppressor for suppressing vibrations in structures, such as buildings. The known device has an actuator attached to the structure and an extendable rod of an actuator attached to a seismic mass which is thus moved by the actuator. According to the reference, the seismic mass is free to move as the actuator is energized and is attached to the floor only through the actuator. However, this may put high demands on the frame structure and actuator force required.

For example, U.S. Pat. No. 5,884,736 describes an active vibration absorber including a frame connected to a structure to be controlled and at least two reaction mass elements operatively connected to the frame. Each of the reaction mass elements is independently movable with respect to said frame. The absorber includes a force generating member for controlling relative movement between the reaction mass elements for damping vibration of the structure. The dual reactive mass absorber requires less control force to produce the same vibration attenuation as conventional single reactive mass absorbers. However, the device is complicated and may be difficult to adapt to different situations.

It is desired to provide an inertial damper that is easy to construct yet adaptable to different situations.

SUMMARY

A first aspect of the present disclosure provides an active inertial damper system for damping vibrations in a structure. A support frame is configured for attachment to the structure to be damped. An inertial mass is supported by the support frame via spring means to form a mass-spring system having a certain resonance frequency. A force actuator is configured to apply a variable driving force between the inertial mass and the support frame. A vibration sensor is configured to measure vibrations in the structure to be damped. A controller is configured to control the force actuator to adapt the driving force as a function of the measured vibrations. The controller comprises a filter determining a magnitude and/or phase of the driving force as a function of frequency for suppressing the measured vibrations in the structure.

By configuring the filter to provide an anti-resonance dip in the magnitude of the driving force at the resonance frequency of the mass-spring system undesired resonant behaviour of the mass-spring system at the resonance frequency can be suppressed. This may prevent e.g. unwanted amplification at the resonance frequency of the mass-spring system which may not be specifically geared to any frequency of vibrational disturbances. For example, the anti-resonance dip may be modelled based on a mass of the inertial mass and a spring constant of the spring means to provide an inverse resonance of the mass-spring system at the resonance frequency. For example, the driving force may be adapted to keep the force exerted by the inertial mass constant, at least in a frequency range around the resonance frequency of the mass-spring system.

By configuring the filter to provide one or more resonance peaks in the magnitude of the driving force at one or more predetermined damping frequencies, vibrations at these frequencies can be more effectively damped with less or no dependence on the specific resonant frequency of the mass-spring system. By providing the controller damping frequencies above the resonance frequency of the mass spring system, the damper can operate more efficiently than if the damping resonances are below the resonance frequency of the mass spring system. Accordingly, the system may be more adaptable to different situations. Furthermore, the filter may provide multiple (separate) resonance peaks to target specific disturbing vibrations from different sources at separate frequencies. This is in contrast to a conventional mass-damper that is tuned to only effectively dampen at or near the resonance frequency while being less effective at further removed frequencies.

By providing the mass-spring system with a relatively low resonance frequency, the range of frequencies at which the device may dampen vibrations can be increased, in particular the lower limit of the range can be lowered. This may be particularly desired for low frequency modes, e.g. floor vibration. For example, the resonance frequency of the mass-spring system is configured to be lower than twenty-five Hertz, preferably lower than fifteen Hertz, e.g. between one and ten Hertz. To provide the mass-spring system with a relatively low resonance frequency, the inertial mass can be relatively high and/or the spring constant can be relatively low. However, if a relatively weak spring is used in combination with a relatively high mass, gravitational forces may cause too much stress on the spring, e.g. in an equilibrium position, which may cause the spring to be overexerted. In some cases, this may negatively influence robustness of the construction.

By supporting the mass with secondary springs that are preloaded at a position of the inertial mass where one or more primary springs are not loaded, the effects of gravity on the primary springs can be limited and the position of the inertial mass can be at least partially restored. For example, the inertial mass may be suspended from the support frame via one or more leaf springs while being further supported by one or more pressure springs that are preloaded at a position of the inertial mass where the one or more leaf springs are not loaded. It will be appreciated that when the support springs are preloaded they may at least partially counteract a gravity force on the inertial mass to alleviate a tension on the one or more leaf springs for allowing the use of relatively weak leaf springs having a relatively low spring constant while preventing excess deviation and/or stress on the leaf springs as a result of gravity. The lower the spring constant of the system, the more the mass will behave as free floating, but without the need for complicated construction.

Because the filter may be programmed with different frequencies, it can be easily adapted to dampen different frequencies. This may advantageously allow a system wherein multiple damper devices are used to control vibrations in a structure. For example, each damper device comprises a respective support frame, inertial mass, spring means, and force actuator. Sensors may be placed near the respective damper devices and control of the damper devices may be centralized. Accordingly, the present damper devices can be more modular, e.g. each device having the same construction differing only by a (programmable) filter and/or control.

By connecting one or more damper devices directly to a building floor, vibrations in an entire room can be damped. This may be more beneficial than dampening each table with a single damper device. Alternatively, or in addition, one or more damper devices may be connected to a machine support frame. The machine support frame may support a vibration sensitive machine. For example the active inertial damper system is used for the benefit of the vibration sensitive machine, e.g. prevent or alleviate disturbing vibrations that would otherwise affect the vibration sensitive machine. The vibration sensitive machine may be placed on the machine support frame. The vibration sensitive machine may be supported by feet disposed between the vibration sensitive machine and the machine support frame. By placing the vibration sensors of the active inertial damper system at or near these positions of the machine feet, the machine may feel minimal vibrations. By attaching one or more damper devices at a bottom of a machine support frame below the vibration sensitive machine, the damping can take place very close to the feet.

By providing a high stiffness machine support frame or rigid pedestal, i.e. connected to the floor with a stiffness at least as high as the building floor, influence of vibrations induced by the machine on top of the pedestal can be less compared e.g. to a table that is vibrationally isolated from the floor. At the same time, the present active inertial damper system may effectively cancel remaining vibrations in the floor and/or table. Typical use of such configuration may be for machines which need a very stable base (e.g. machine with fast moving stages) and where the vibration problems are only in a certain frequency area (e.g. 30-50 Hz).

Further advantages may be achieved by aspects of the present disclosure relating to a method of damping vibrations in a structure. For example, a damping device is attached to the structure to be damped and an inertial mass is supported by the support frame via spring means to form a mass-spring system having a resonance frequency. A force actuator applies a variable driving force between the inertial mass and the support frame. The method comprises measuring vibrations in the structure to be damped and controlling the damping device to adapt the driving force as a function of the measured vibrations using a filter determining a magnitude and phase of the driving force as a function of frequency for the measured vibrations in the structure. Preferably, the filter provides an anti-resonance dip in the magnitude of the driving force at the resonance frequency of the mass-spring system to suppress resonant behaviour of the mass-spring system itself. Preferably, the filter provides one or more resonance peaks in the magnitude of the driving force at one or more predetermined damping frequencies that are above the resonance frequency of the mass-spring system for dampening vibrations in the structure at the predetermined damping frequencies with minimal influence of resonant behaviour of the mass-spring system.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
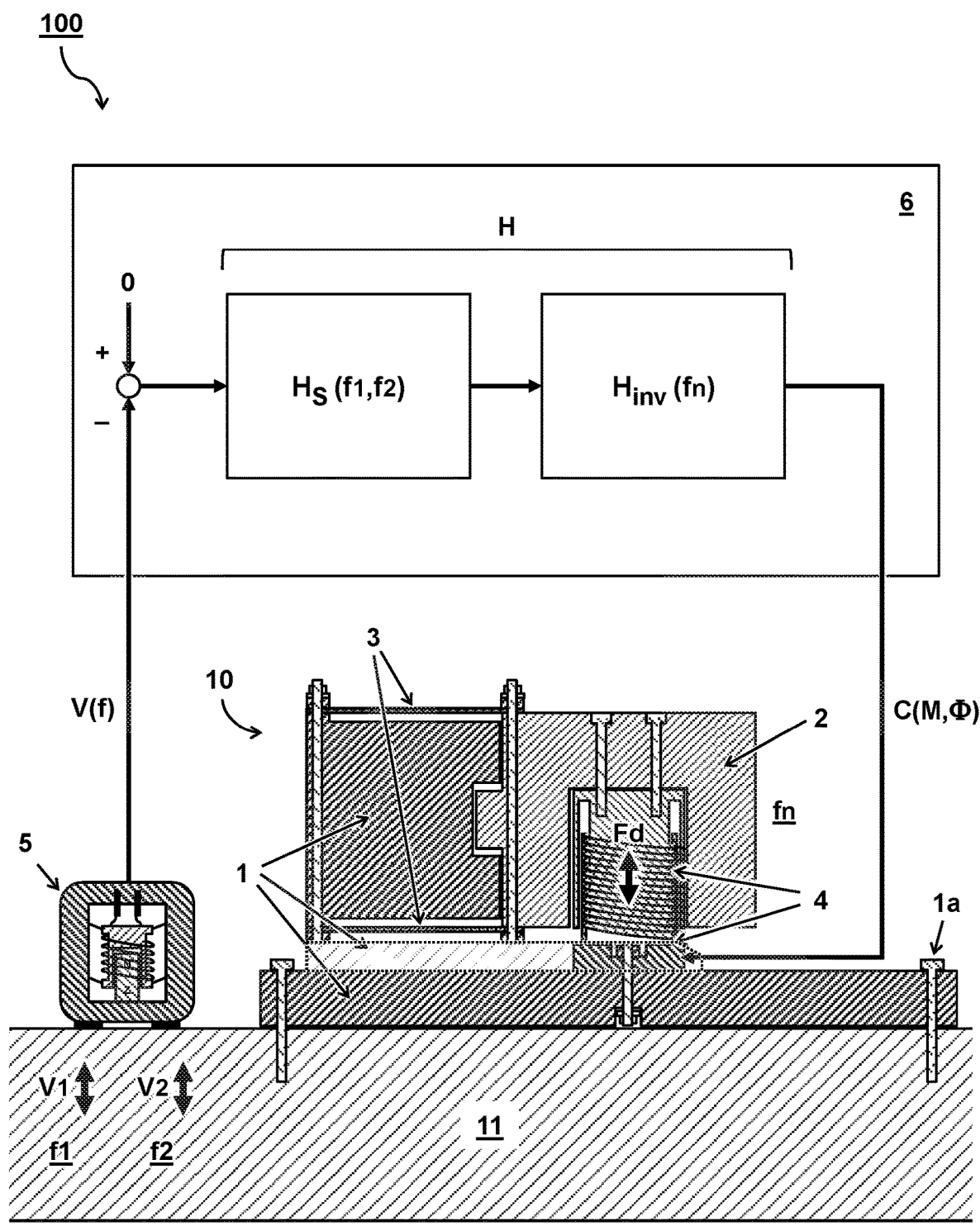
FIG. 1 schematically illustrates an embodiment of an active inertial damper system.

In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. This invention may, however, be embodied in many different forms and should not be construed as limited to the embodiments set forth herein. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 schematically illustrates an embodiment of an active inertial damper system 100 for damping vibrations V1,V2 in a structure 11.

In one embodiment, the system 100 comprises a support frame 1 configured for attachment to the structure 11 to be damped. For example, the frame 1 is attached to the structure 11 to be damped by attachment means 1a such as screws. Also other attachment means, e.g. glue or resin can be used. Also, the damper device 10 may be contacting the structure (11) to be damped without being attached, e.g. with defined contact points such as rubber feet.

In one embodiment, the system 100 comprises an inertial mass 2 supported via spring means 3 to form a mass-spring system 2,3 having a resonance frequency "fn". Preferably, the inertial mass 2 is supported by the support frame 1. In principle, the spring means may comprise any type spring element or combination of spring elements, e.g. leaf springs, pressure springs, etcetera.

In one embodiment, the system 100 comprises a force actuator 4 configured to apply a variable driving force Fd between the inertial mass 2 and the support frame 1. The force actuator 4 may be any device capable of causing a variable and controllable driving force Fd between the support frame 1 and the inertial mass 2.

In one embodiment, the system 100 comprises a vibration sensor 5 is configured to measure vibrations V1,V2 in the structure 11 to be damped. The vibration sensor 5 may be any device capable of measuring the vibrations V1,V2. For example a velocity sensor and/or acceleration sensor may be used.

In one embodiment, the system 100 comprises a controller 6 configured to control the force actuator 4 to adapt the driving force Fd as a function of the measured vibrations V1,V2. For example, the controller 6 is configured to send a control signal C to the force actuator 4 which may determine a magnitude or gain of the driving force Fd. Typically, the controller 6 is configured to adapt an amplitude, frequency and/or phase of the driving force Fd to minimize an amplitude of the measured vibrations Vx (e.g. V1 or V2) of the structure 11, e.g. building floor or machine support frame. For example, the controller 6 is configured to adapt a frequency of the driving force Fd to have the inertial mass 2 oscillate at a main frequency of the floor vibrations Vx. For example, the controller 6 is configured to adapt the phase of the driving force Fd to have the inertial mass 2 oscillate out of phase with the floor vibrations Vx to cancel the floor vibrations. For example, the controller 6 comprises a filter H determining a magnitude M and/or phase Φ of the driving force Fd as a function of frequency f for the measured vibrations V1,V2 in the structure 11.

In one embodiment, the support frame 1, inertial mass 2, spring means 3, and force actuator 4 are comprised in a single unit referred herein as the damper devices 10. In the shown embodiment, the vibration sensor 5 is a separate device coupled to the force actuator 4 via the controller 6. Alternatively, the vibration sensor 5 and/or controller 6 may also be integrated in the damper device 10. Keeping the vibration sensor 5 as a separate device may provide the advantage that vibrations measured at one place may be damped at another place. Usually, however, the vibration sensor 5 is placed in close proximity to the damper device 10. Keeping the controller 6 as a separate device may have the advantage that multiple damper devices 10 (not shown here) may be controlled by a central controller. Using a central controller may enable the use of several damping devices and or sensors and may result in more effective vibration cancellation in an entire floor field or other structure.

In one embodiment, the filter H comprises an estimator filter Hinv configured to provide an anti-resonance dip in the magnitude M of the driving force Fd at the resonance frequency "fn" of the mass-spring system 2,3 for suppressing resonant behaviour of the mass-spring system. In another or further embodiment, the filter H comprises a damping filter Hs configured to provide one or more resonance peaks in the magnitude M of the driving force Fd at one or more predetermined damping frequencies f1,f2 that are preferably above the resonance frequency "fn" of the mass-spring system 2,3 for dampening vibrations in the structure 11 at the predetermined damping frequencies f1,f2 with minimal influence of resonant behaviour of the mass-spring system.

In some embodiments, the filter H is configured to provide increased magnitude M of the driving force Fd over an extended range of predetermined damping frequencies, e.g. the magnitude is more than five, ten, twenty, or even thirty decibels over a range of more than ten, twenty, fifty, hundred or even thousand Hertz. Depending on the vibrations to be suppressed, a filter may comprise multiple relatively narrow peaks to cover individual determined vibrations, or a broad peak/continuous band to cover vibrations over a range of frequencies, In another or further embodiment, the filter H is configured to determine a phase Φ of the driving force Fd as a function of frequency f for the measured vibrations V1,V2 in the structure 11. The filters may be integrated or split into further components. Preferably, the filters are programmable for more flexibility of the damping frequencies f1,f2. Alternatively, or in addition, filter functionality may be partly or wholly provided by hardware components.

Figure 2:
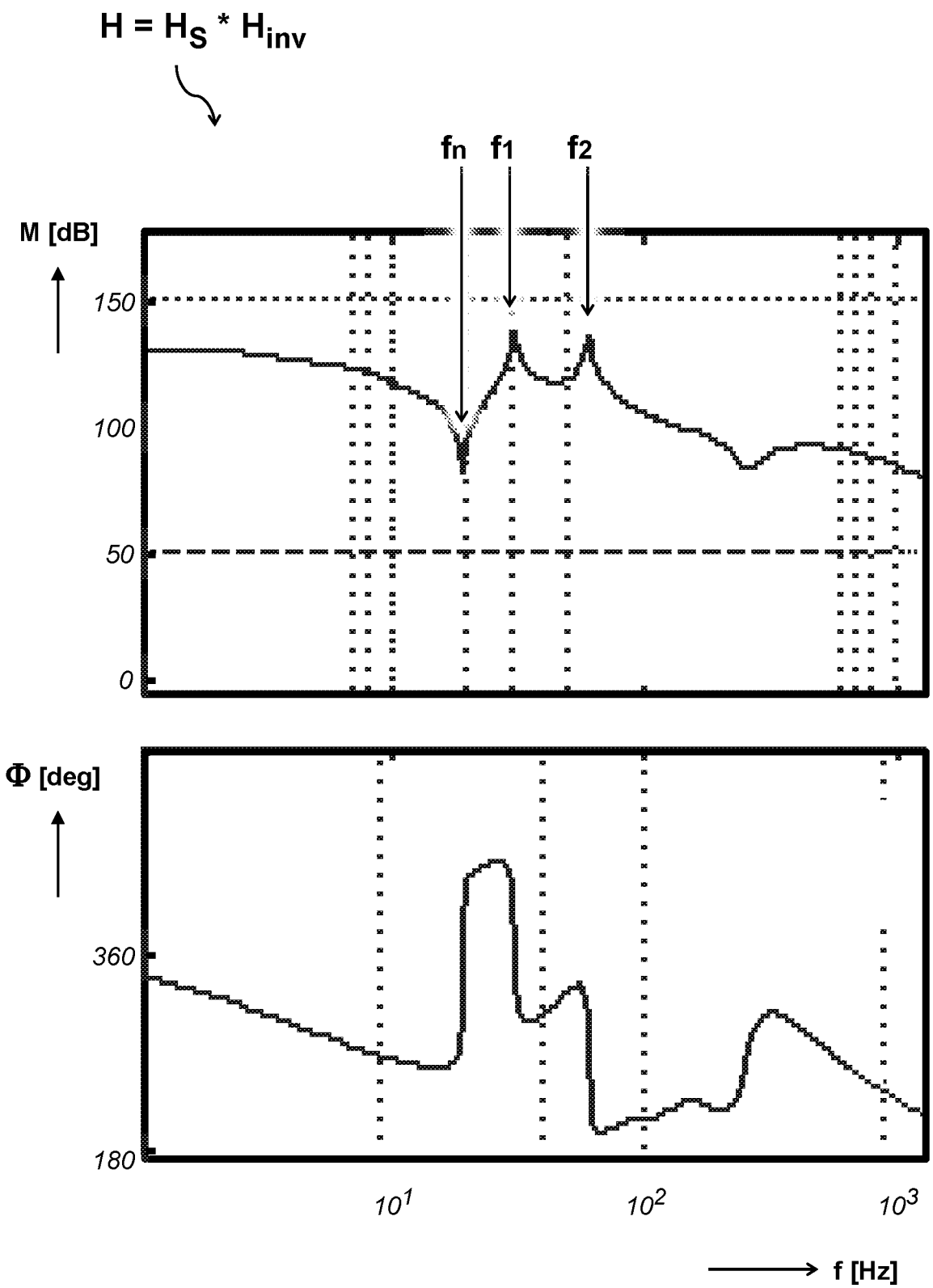
FIG. 2 shows a Bode plot of an embodiment of a control filter.

FIG. 2 shows a Bode plot of an embodiment of a combined filter Hs*Hinv, e.g. as described with reference to FIG. 1.

For example, the filter is configured to determine a magnitude M and phase Φ of the driving force Fd so as to cancel measured vibrations predominantly at frequencies f1 and f2. In one embodiment, the filter is configured to provide at least two separate resonance peaks in the magnitude M of the driving force Fd at respective predetermined damping frequencies f1,f2 that are both above the resonance frequency "fn" of the mass-spring system. For example, the resonance frequency "fn" of the mass-spring system 2,3 is lower than twenty-five Hertz, preferably lower than fifteen Hertz, e.g. ten Hertz.

In one embodiment, the damping frequencies f1,f2 of the filter are at least ten percent higher than the resonance frequency "fn" of the mass-spring system, preferably at least twenty-five percent higher, more preferably at least fifty percent higher. For example, the resonance peaks of the filter Hs are at frequencies between two and a hundred times the resonance frequency "fn" of the mass-spring system. In one embodiment, the predetermined damping frequencies f1,f2 are separated by at least ten Hertz, at least twenty Hertz, at least thirty Hertz, or more.

Also other filters may be present. For example, the filter H may comprise a high pass filter for reducing the driving force Fd at low frequencies, e.g. below ten Hertz. For example, the filter H may comprise a low pass filter to reduce noise amplification at high frequencies, e.g. above hundred Hertz or higher, e.g. above three hundred Hertz. For example, the filter H may comprise a notch filer to increase damping at a specific disturbing frequency. For example, the filter H may comprise a phase lag or phase lead filter to improve controller robustness and stability. For example, one or more of filters may be parametrized as follows.

| | | |
|---|---|---|
| High pass | $\frac{j\omega}{j\omega + w_{hp}}$ | $W_{hp} = 10 * 2\pi$ |
| Low pass | $\frac{w_{lp}}{j\omega + w_{lp}}$ | $W_{lp} = 300 * 2\pi$ |
| Notch filter | $\frac{(j\omega)^2 + 2b_1\omega_1 j\omega + \omega_1^2}{(j\omega)^2 + 2b_2\omega_1 j\omega + \omega_1^2}$ | $\omega_1 = 30 * 2\pi, b_1 = 1, b_2 = 0.01$ |
| Broadband notch filter | $\frac{(j\omega)^2 + 2b_1\omega_1 j\omega + \omega_1^2}{(j\omega)^2 + 2b_2\omega_1 j\omega + \omega_1^2}$ | $\omega_1 = 40 * 2\pi, b_1 = 3, b_2 = 0.2$ |
| Phase lag/lead | $\frac{b_1 j\omega + a_1}{b_2 j\omega + a_2}$ | $a_1 = 3, b_1 = 0.028,$ $a_2 = 1, b_2 = 0.028$ |

Figure 3A:
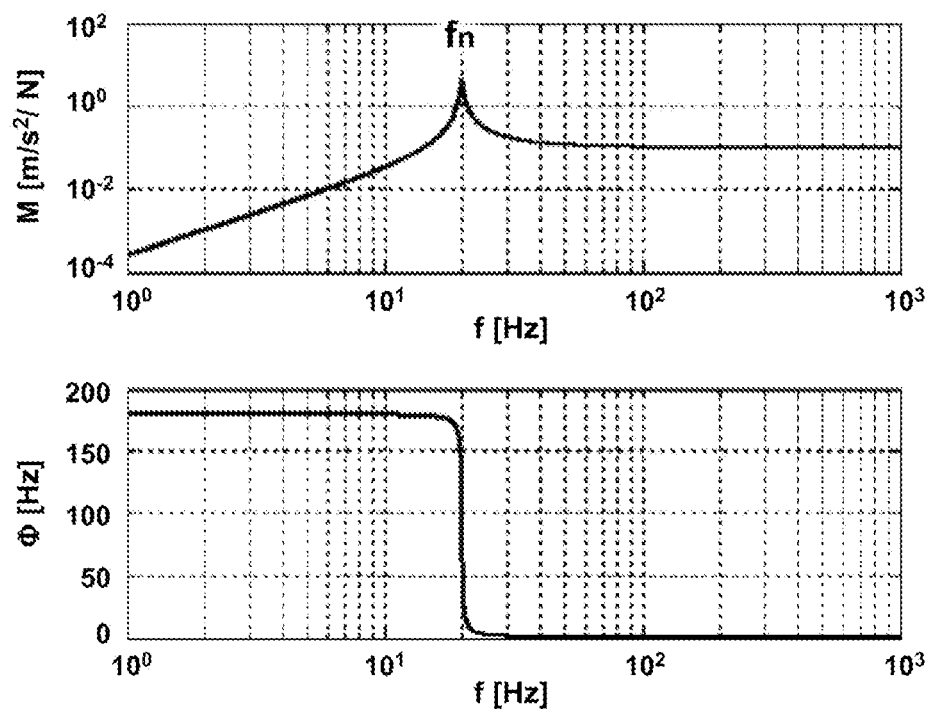
FIG. 3A shows a Bode plot of a modelled resonance peak of a mass-spring system.
Figure 3B:
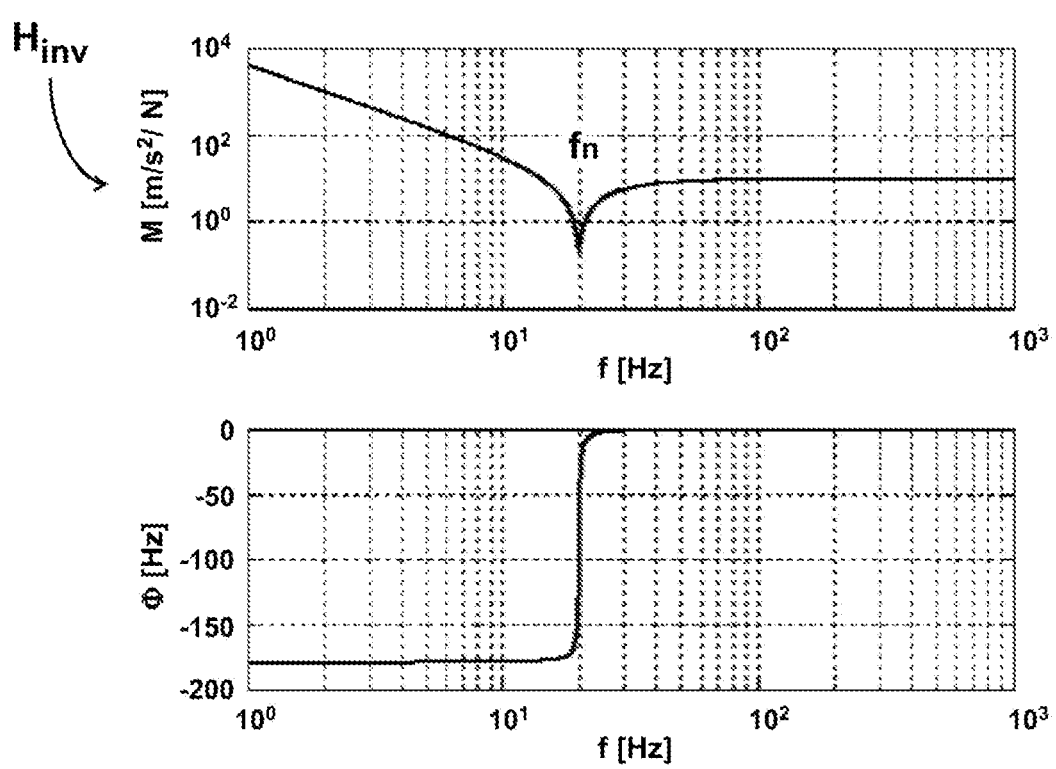
FIG. 3B shows a Bode plot of a corresponding resonance dip of a filter to compensate for the resonance of the FIG. 3A.

FIG. 3A shows a Bode plot of a modelled resonance peak at frequency fn, e.g. of the mass-spring system as shown in FIG. 1. FIG. 3B shows a Bode plot of a corresponding resonance dip of a filter to compensate for the resonance of the FIG. 3A;

In one embodiment, the filter as described herein comprises an anti-resonance dip modelled based on a mass of the inertial mass and a spring constant of the spring means to provide an inverse resonance of the mass-spring system at the resonance frequency "fn". For example, the filter comprises a notch filter to decrease magnitude at the resonance frequency "fn" of the mass-spring system.

It may be noted that at frequencies below the resonance frequency, less actuator force may end up in the structure to be damped, e.g. floor, due to spring stiffness. Without being bound by theory this can be understood from the following equations.

Equation of motion of the inertial mass:

$$\ddot{x}_m m = F + k(x_f - x_m)$$

where "m" is the inertial mass, $x_m$ is position of the mass (double dot means acceleration), $x_f$ is position of the floor (of other structure to be damped), "k" is the (combined spring) constant, and F is the applied (actuator) force.

Force on floor ($F_{floor}$) is equal to:

$$F_{floor} = -F - k(x_f - x_m)$$

According to equation of motion of m:

$$F = \ddot{x}_m m - k(x_f - x_m)$$

Together, this results in:

$$F_{floor} = -\ddot{x}_m m$$

At frequencies below the resonance most of the actuator force is required to overcome spring force $k\Delta x$:

$$F_{floor} = -F - k\Delta x$$

On the other hand, at high frequencies above the resonance, the spring force $k\Delta x$ is negligible and most of the actuator force is effectively resulting in acceleration of mass "m":

$$\ddot{x}_m m >> k\Delta x \text{ so that } F_{floor} = \ddot{x}_m m \approx F$$

Figure 4A:
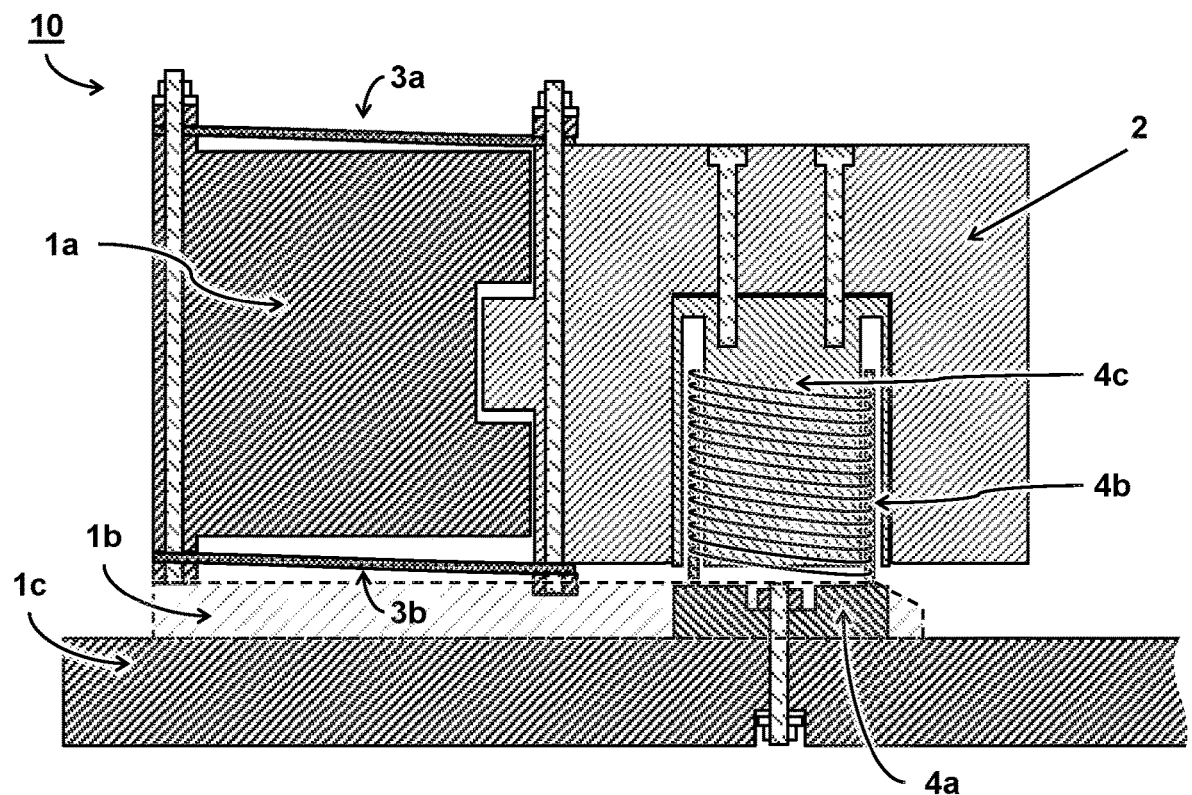
FIG. 4A schematically illustrates an embodiment of a damper device.
Figure 4B:
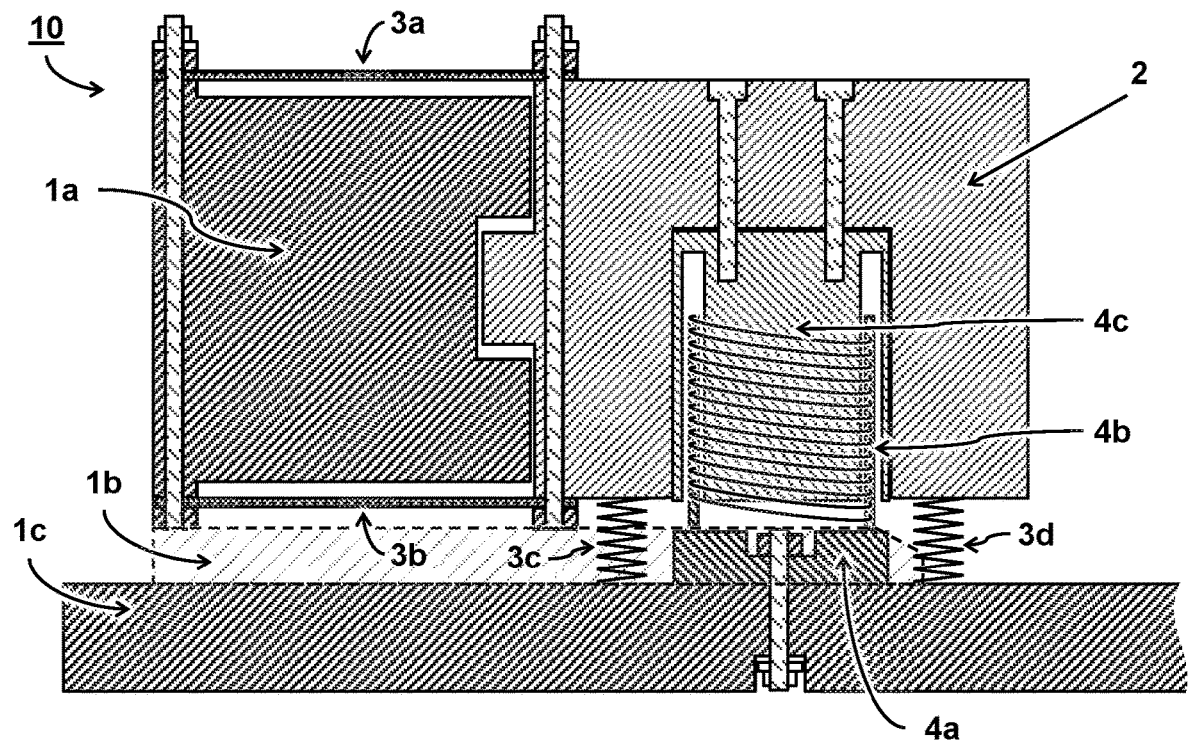
FIG. 4B schematically illustrates a similar embodiment as FIG. 4A, but including preloaded support springs.

FIG. 4A schematically illustrates an embodiment of a damper device 10. FIG. 4B schematically illustrates a similar embodiment as FIG. 4A, but including preloaded support springs 3c,3d.

In one embodiment, the force actuator 4 comprises a coil 4b powered by an electrical source (not shown) and a magnet 4c moveable inside windings of the coil 4b. For example, the magnet 4c is connected to the inertial mass 2 and the coil 4b is connected to the support frame 1 via an actuator frame 4a, or vice versa.

In one embodiment, the inertial mass 2 is supported by the support frame 1 via one or more primary springs 3a,3b and one or more support springs 3c,3d that are preloaded at a mass position of the inertial mass 2 where the one or more primary springs 3a,3b are not loaded. For example, the inertial mass 2 is suspended from the support frame 1 via one or more leaf springs 3a,3b and wherein the inertial mass 2 is further supported by one or more pressure springs 3c,3d that are preloaded at a mass position of the inertial mass 2 where the one or more leaf springs 3a,3b are not loaded.

In another or further embodiment, wherein the support springs 3c,3d are preloaded to at least partially counteract a gravity force on the inertial mass 2 to alleviate a tension on the one or more leaf springs 3a,3b for allowing the use of relatively weak leaf springs having a relatively low spring constant while preventing excess deviation and/or stress on the leaf springs as a result of gravity. In another or further embodiment, the one or more primary 3a,3b have a combined first spring constant K1 and the preloaded support springs 3c,3d have a second spring constant K2, wherein the second spring constant K2 is less than half the first spring constant K1, preferably less than one tenth. In another or further embodiment, at a rest position of the inertial mass, the one or more preloaded support springs 3c,3d are at least twice as far from their equilibrium position as the one or more leaf springs 3a,3b.

Figure 5A:
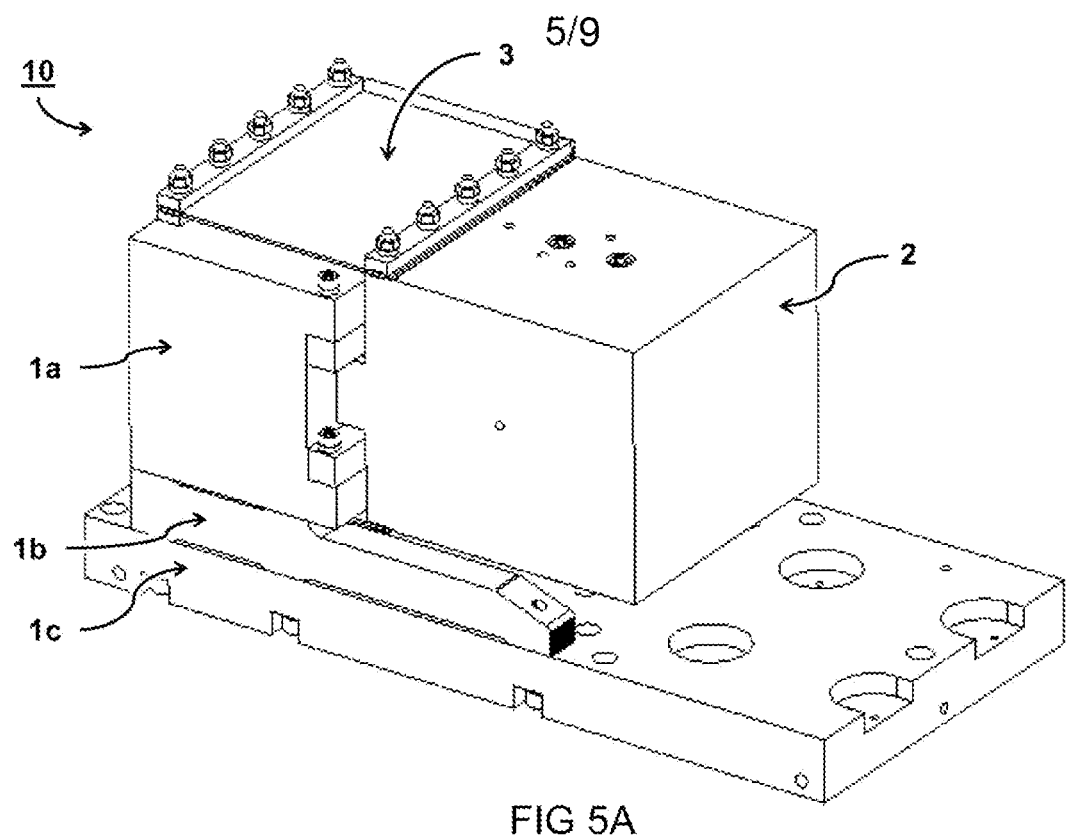
FIG. 5A schematically illustrates a perspective view of an embodiment of a damper device.
Figure 5B:
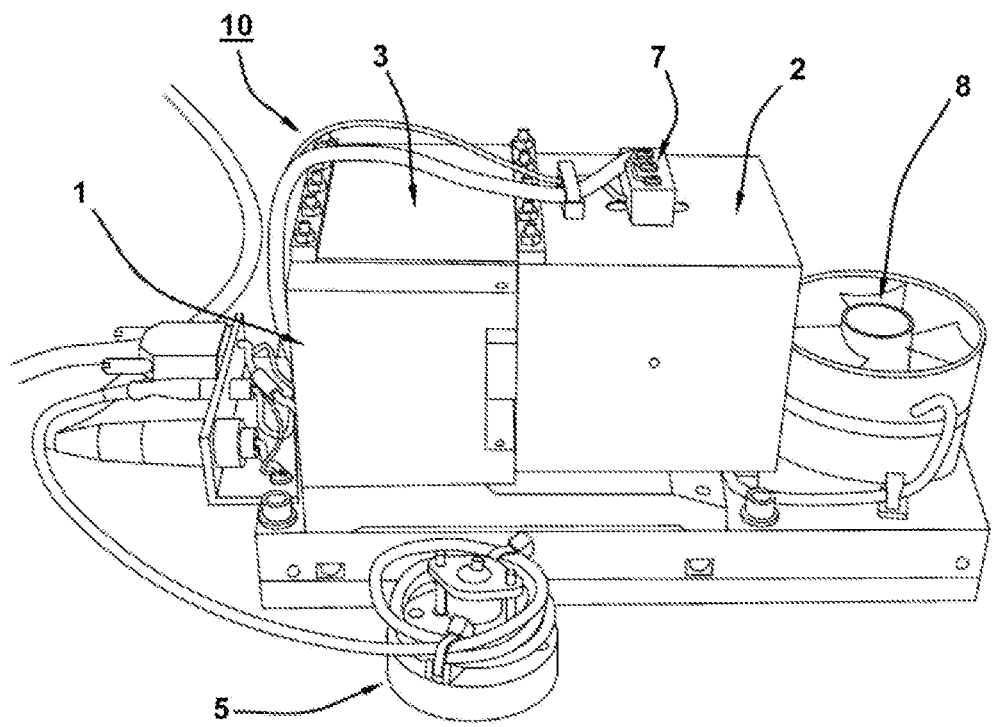
FIG. 5B schematically illustrates a photo of an embodiment of a damper device.

FIG. 5A schematically illustrates a perspective view of an embodiment of a damper device 10. FIG. 5B schematically illustrates a photo of an embodiment of a damper device 10 including a separate vibration sensor 5.

In one embodiment, the support frame 1 comprises a bottom plate 1c which may be connected to a structure to be damped. In another or further embodiment, the support frame 1 comprises a support block 1a on top of the bottom plate with support feet 1b there between, wherein the support block 1a is configured to carry the inertial mass 2 via the spring means 3, wherein the support frame 1 is configured to allow oscillation of the inertial mass 2. Of course also other configurations can be envisaged.

In one embodiment, the system comprises an acceleration sensor 7 configured to measure an acceleration of the inertial mass 2. In another or further embodiment, the controller (not shown) is configured to adapt the driving force based on the measured acceleration. For example, the controller 6 is configured to calculate a force exerted by the inertial mass 2 based on the measured acceleration, e.g. using the relation Force=mass*acceleration. In another or further embodiment, the controller is configured to adapt the driving force to keep the force exerted by the inertial mass constant at least in a frequency range around the resonance frequency "fn" of the mass-spring system 2,3. In one embodiment, the acceleration sensor 7 may be used instead of the filter Hinv as described in FIG. 1. However, the filter Hinv may be preferably because it does not require the additional hardware of the acceleration sensor 7. Furthermore, no delay and performance degradation from the acceleration loop overshoot may enable faster control.

In one embodiment, the support frame 1 forms a heat sink to draw heat from the force actuator (not visible here). In another or further embodiment, the support frame 1 comprises an active cooler 8, e.g. fan to draw heat from the support frame 1. Accordingly, a more powerful force actuator may be used or the damping device may be used in environments with more temperature variation.

Figure 6A:
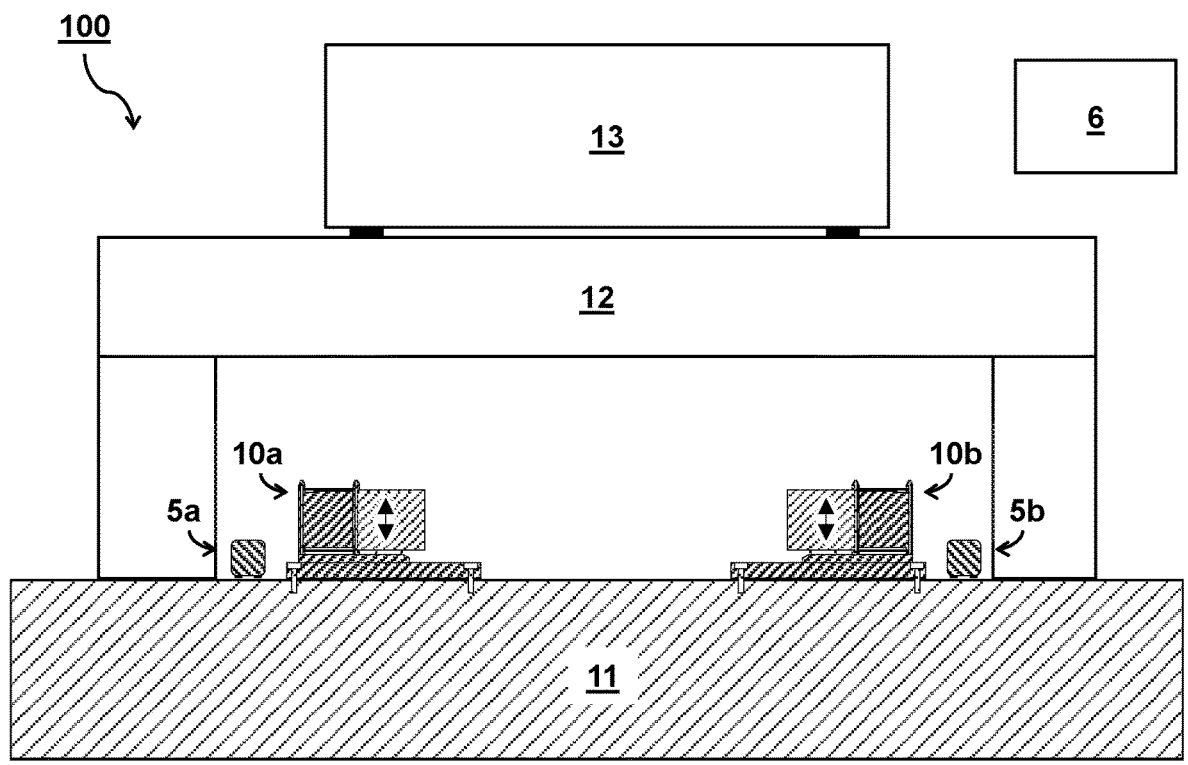
FIG. 6A schematically illustrates an embodiment of a system comprising multiple damper devices attached to a building floor.

FIG. 6A schematically illustrates an embodiment of a system comprising multiple damper devices 10a,10b attached to a building floor 11. For example, each damper device 10 comprises a respective support frame 1, inertial mass 2, spring means 3, and force actuator 4.

Figure 6B:
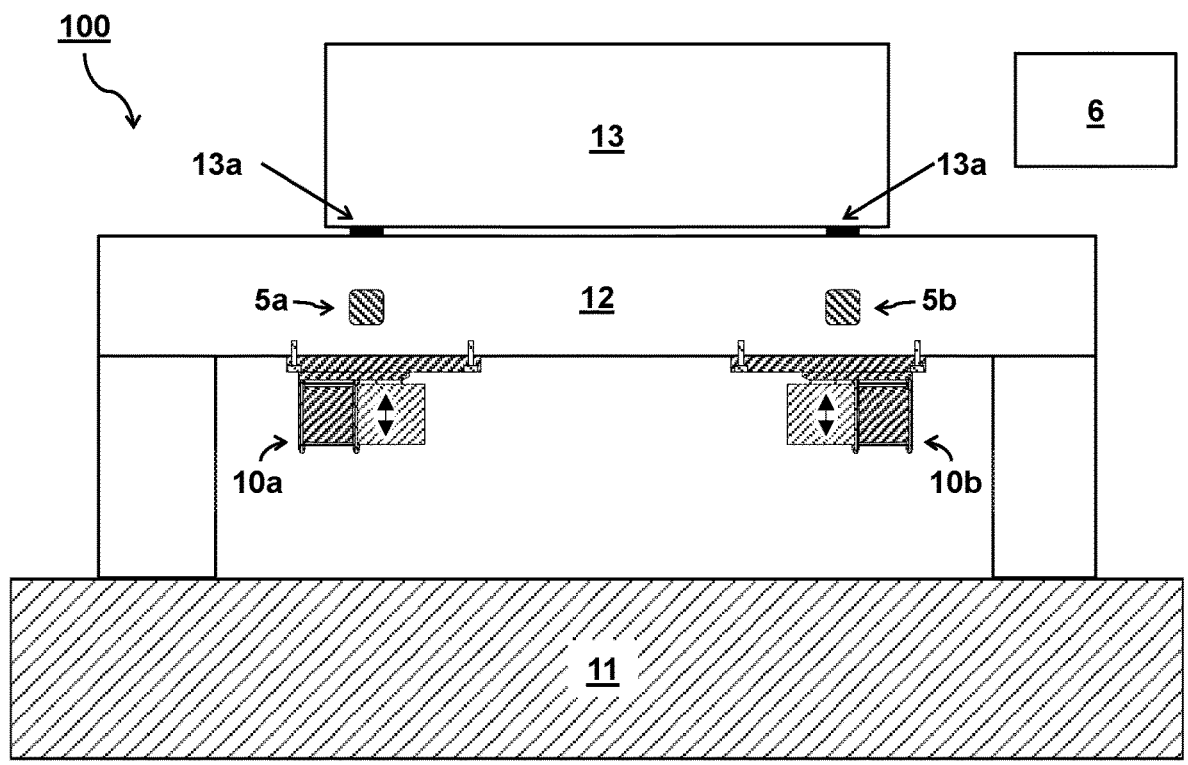
FIG. 6B schematically illustrates an embodiment of a system comprising multiple damper devices attached to a machine support frame.

FIG. 6B schematically illustrates an embodiment of a system 100 comprising multiple damper devices 10a, 10b attached to a machine support frame 12. In another or further embodiment, the multiple damper devices (10a,10b) are controlled by a central controller 6, e.g. integrated in a single device. In another or further embodiment, the system 100 comprises multiple vibration sensors 5a,5b. In another or further embodiment, multiple vibration sensors 5a,5b are also connected to the central controller 6. For example, one or more support frames of the active inertial damper system are connected to a machine support frame 12 for supporting a vibration sensitive machine 13. For example, the active inertial damper system 100 is used to dampen vibrations that would otherwise affect the machine 13. In one embodiment, the vibration sensitive machine 13 is standing on the machine support frame 12 supported by machine feet 13a, 13b. In another or further embodiment, vibration sensors 5a,5b of the active inertial damper system 100 are positioned at positions of the machine feet 13a,13b for damping vibrations at the machine feet 13a,13b. For example, a vibration sensor is positioned within ten centimetres from a respective machine foot, or closer, e.g. within five centimetres or even within one centimetre. In one embodiment, multiple damper devices 10a,10b are attached at a bottom of a machine support frame 12 below the vibration sensitive machine 13. In one embodiment, the machine support frame 12 is standing on a building floor 11, wherein the machine support frame 12 has a higher stiffness than the building floor.

Figure 7A:
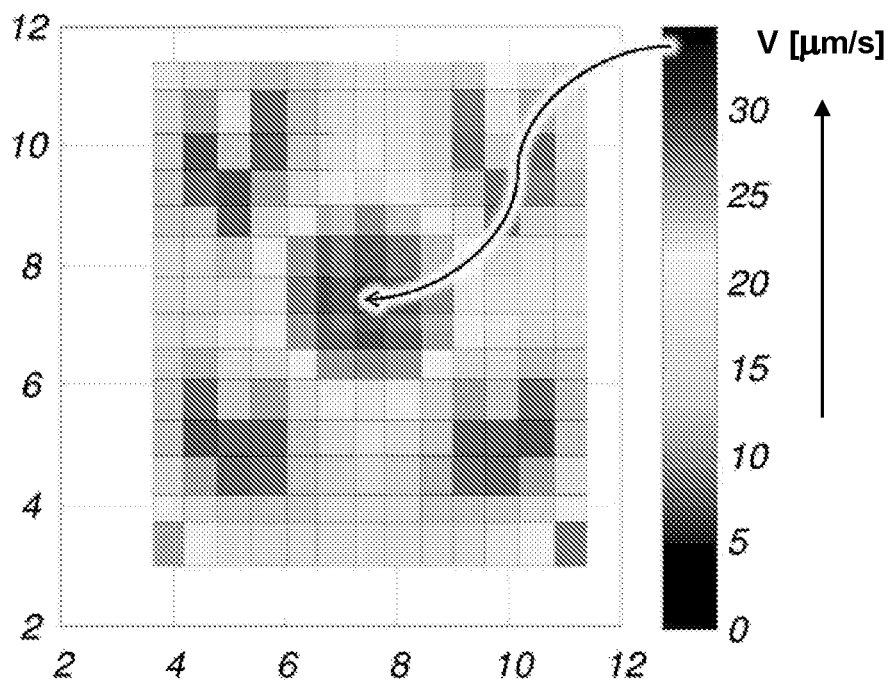
FIG. 7A schematically illustrates a simulation of vibrations in a building without damping.
Figure 7B:
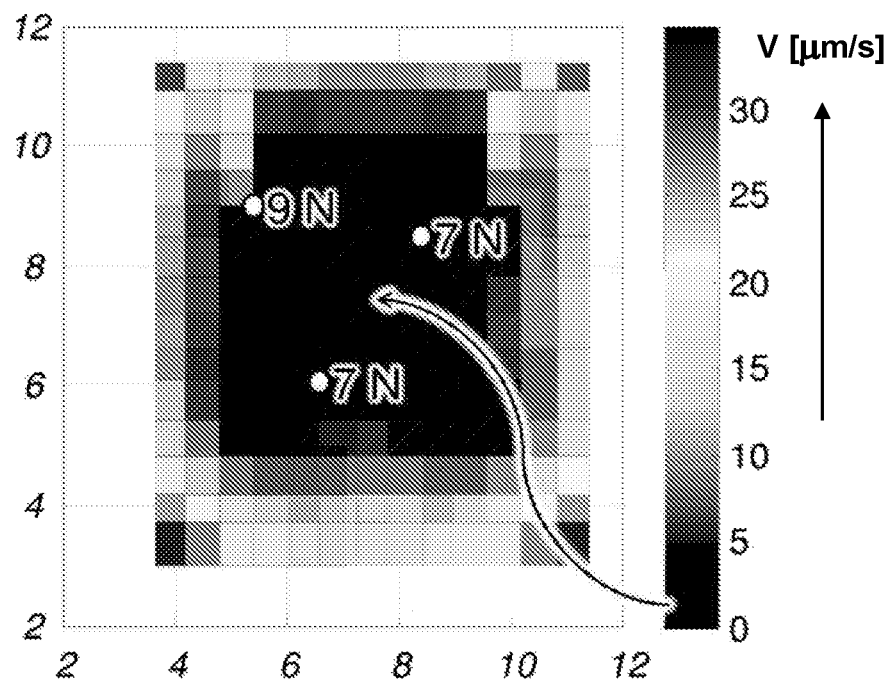
FIG. 7B schematically illustrates a simulation of vibrations in a building with damping by three damper devices.

FIG. 7A schematically illustrates a simulation of vibrations in a building floor without damping, For example, the map shows an intensity of vibrations at different locations of the building floor. FIG. 7B schematically illustrates a further simulation but wherein the floor is damped by three damper devices placed as indicated by white dots and respective forces of 7 N (Newton), 7 N and 9 N.

One aspect of the present disclosure provides a method of damping vibrations in a structure. In one embodiment, the method comprises providing a damping device comprising a support frame attached to the structure to be damped, an inertial mass supported by the support frame via spring means to form a mass-spring system having a resonance frequency; and a force actuator configured to apply a variable driving force between the inertial mass and the support frame. In another or further embodiment, the method comprises measuring vibrations in the structure to be damped and controlling the damping device to adapt the driving force as a function of the measured vibrations using a filter as described herein determining a magnitude of the driving force as a function of frequency for the measured vibrations in the structure. For example, the support frame of the damping device is directly attached to a building floor for cancelling vibrations in the building floor. For example, multiple damping devices are attached at different positions on the structure to be damped.

According to one embodiment, a procedure to determine where to put damping devices damping device may include one or more of the following steps.

1) Measure floor vibrations on whole floor field of interest and compare to specification.

2) Determine dominant vibration frequencies that need to be damped

3) Put one damping device at middle of floor field and measure damper device force to floor velocity transfer function from one force to several locations on the field, typically one to one-and-half meters apart. Alternatively, or in addition, this can also be done by modal hammer and floor sensor
   a) Are there significant resonances near the dominant vibration frequencies? Typically for higher frequencies more actuators are desired because of the higher modal density
   b) Determine the number of damping devices and their locations that are needed to reduce the floor vibrations to the specification with a dynamic model:
      i) Tune a controller offline based on data from one force to one velocity
      ii) Use sequential loop-shaping to determine the effect on the other channels, did effect of disturbance to velocity on all field points result in 'within-spec' values?
      iii) Tune second loop and third loop if necessary etc.
   c) Determine the force per damping device 4) Design and placement
   a) Scale damping device force if needed
   b) Provide number of damping devices and a controller (e.g. cabinet)

5) Put damping devices on the designed locations and repeat step 1.

FIGS. 8A-8D illustrates various Bode diagrams of embodiments for control filters and their corresponding effect on example vibration levels. The top left side of each figure shows the magnitude of the driving force as a function of frequency. The bottom left side shows the corresponding phase. The top right side shows a vibration level example, with the cancellation of the filter on and off. The bottom right side, shows the magnitude of the cancellation.

Figure 8A:
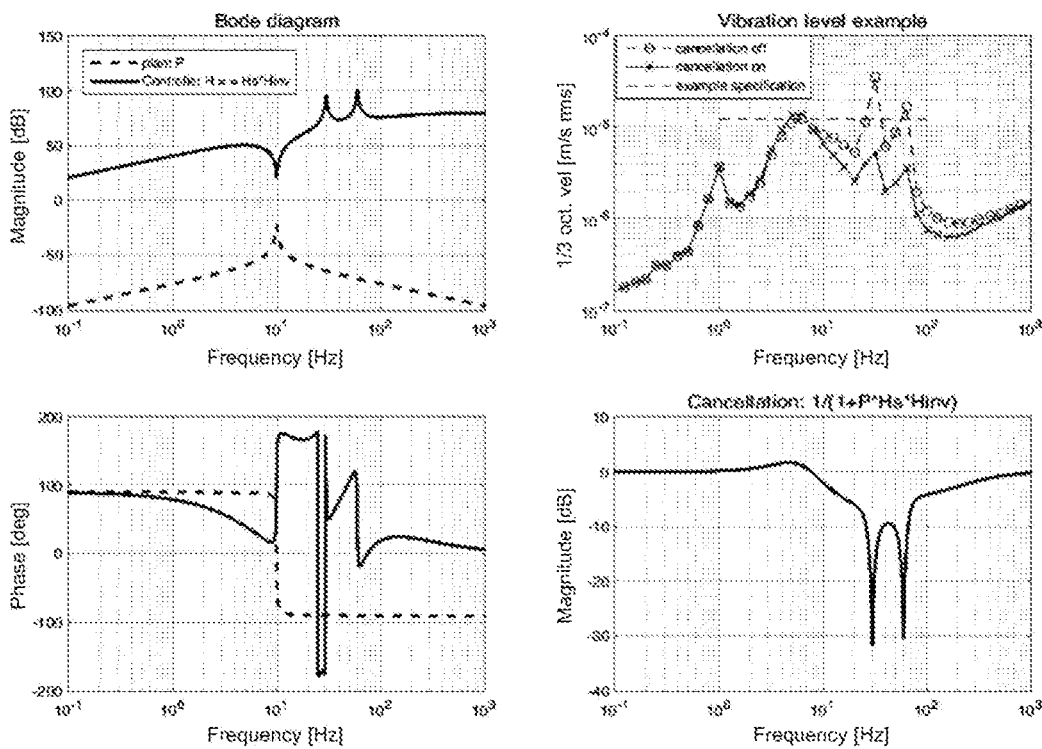
FIGS. 8A-8D illustrates various Bode diagrams of embodiments for control filters and their corresponding effect on example vibration levels.
Figure 8B:
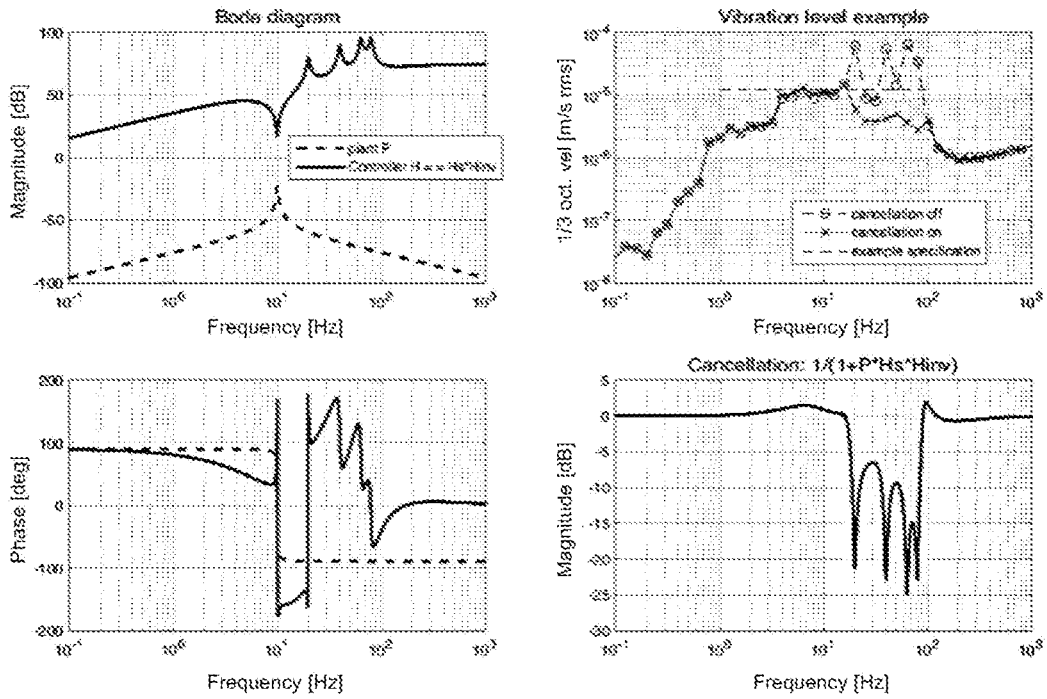
Figure 8C:
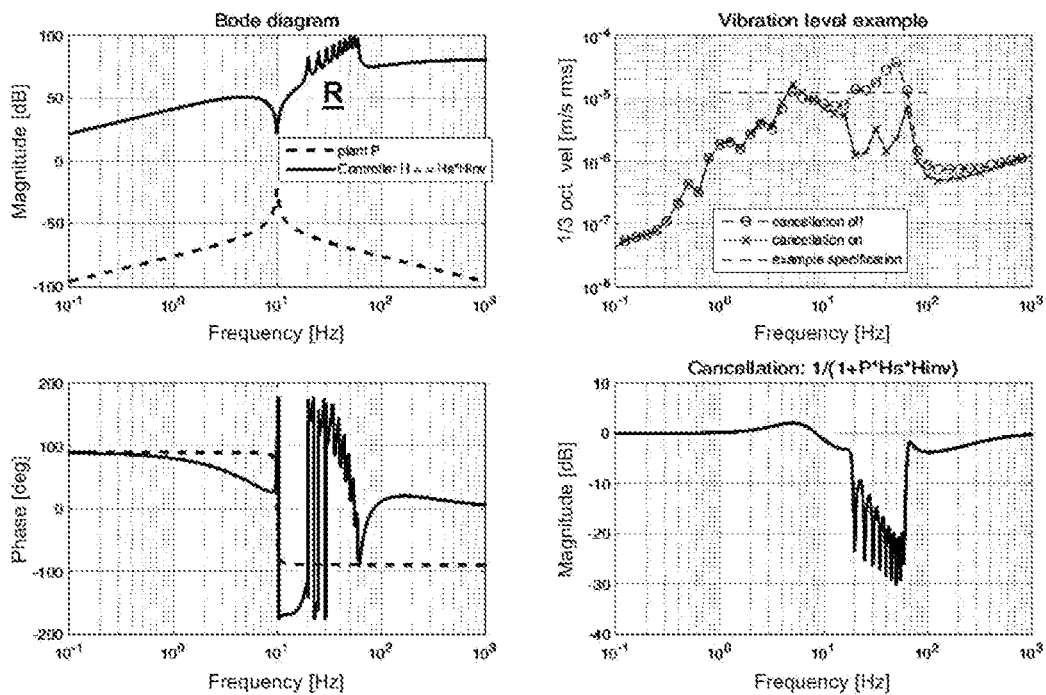
Figure 8D:
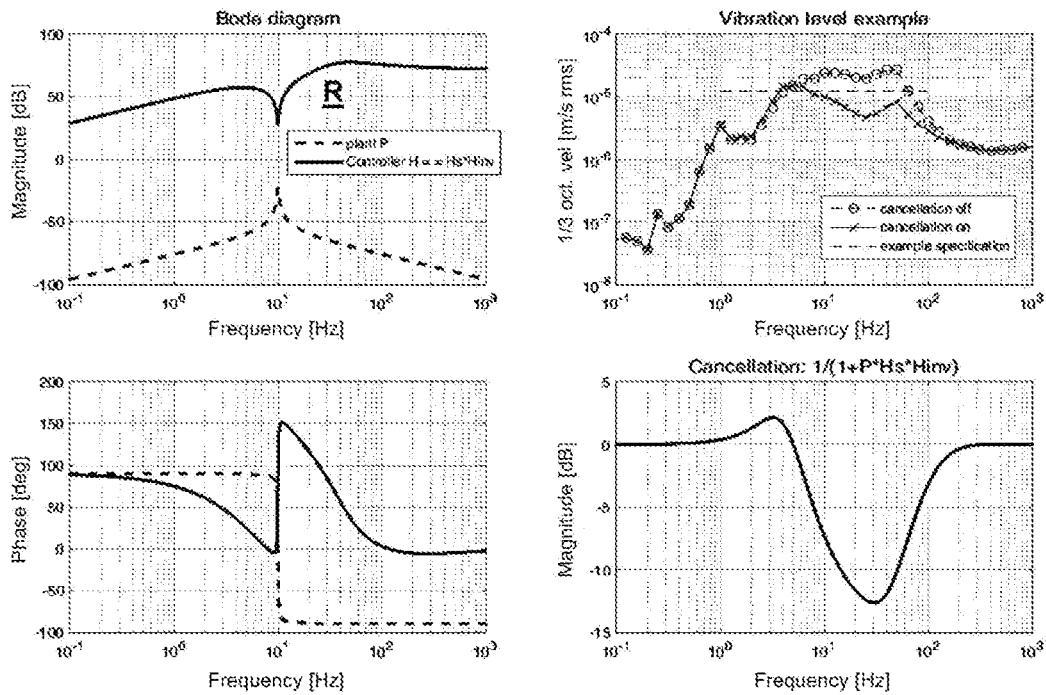

The filters according to the shown embodiments have an anti-resonance dip at the resonance frequency of the mass spring system and significantly increased damping magnitude above this frequency. In the embodiment of FIG. 8A, the filter has two resonance peaks. In the embodiment of FIG. 8B, the filter has four resonance peaks. In the embodiment of FIG. 8B, the filter has many resonance peaks over a range of frequencies R. In the embodiment of FIG. 8B, the filter has a very broad resonance peak forming a band that dampens any frequencies in the range R above the resonance frequency of the mass spring system.

While the figures may show a damper device configured to control vibrations in a vertical direction, the damper device may also be configured to control vibrations in a horizontal direction, or in a combination of horizontal and vertical directions. For example, the inertial mass and spring means may be configured to vibrate partially or entirely in a horizontal direction. Alternatively, or in addition, the support frame of the damper device may be connected at an angle to a horizontal surface of the structure to be damped, e.g. to a side of the machine support frame. Alternatively, or in addition, the damper device may comprise multiple inertial masses that are configured to vibrate in different directions. Also multiple (separate or integrated) sensors can be used to detect vibrations in different directions.

For the purpose of clarity and a concise description, features are described herein as part of the same or separate embodiments, however, it will be appreciated that the scope of the invention may include embodiments having combinations of all or some of the features described. For example, while embodiments were shown for specific configurations of an active inertial damper system also alternative ways may be envisaged by those skilled in the art having the benefit of the present disclosure for achieving a similar function and result. E.g. mechanical and/or electrical components may be combined or split up into one or more alternative components. The various elements of the embodiments as discussed and shown offer certain advantages, such as damping unwanted vibrations in structures. Of course, it is to be appreciated that any one of the above embodiments or processes may be combined with one or more other embodiments or processes to provide even further improvements in finding and matching designs and advantages. It is appreciated that this disclosure offers particular advantages to damping vibrations for the benefit of sensitive machinery, and in general can be applied for any application wherein vibration control is desired.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. An active inertial damper system for damping vibrations in a structure, the system comprising
    a support frame configured for attachment to the structure to be damped;
    an inertial mass supported by the support frame via spring means to form a mass-spring system having a resonance frequency;
    a force actuator configured to apply a variable driving force between the inertial mass and the support frame;
    a vibration sensor configured to measure vibrations in the structure to be damped; and
    a controller configured to control the force actuator to adapt the variable driving force as a function of the measured vibrations, wherein the controller comprises a filter determining a magnitude of the variable driving force as a function of frequency for suppressing the measured vibrations in the structure, wherein the filter provides increased magnitude of the driving force over a range of predetermined damping frequencies that are above the resonance frequency of the mass-spring system and further provide an anti-resonance dip in the magnitude of the variable driving force at the resonance frequency of the mass-spring system to suppress resonant behaviour of the mass-spring system itself.

2. The system according to claim 1, wherein the filter is configured to provide one or more resonance peaks in the magnitude of the variable driving force at one or more predetermined damping frequencies that are above the resonance frequency of the mass-spring system.

3. The system according to claim 1, wherein the anti-resonance dip is modelled based on a mass of the inertial mass and a spring constant of the spring means to provide an inverse resonance of the mass-spring system at the resonance frequency.

4. The system according to claim 1, wherein the filter is configured to provide at least two separate resonance peaks in the magnitude of the variable driving force at respective predetermined damping frequencies that are both above the resonance frequency of the mass-spring system.

5. The system according to claim 1, wherein the resonance frequency of the mass-spring system is lower than twenty-five Hertz.

6. The system according to claim 1, wherein the damping frequencies of the filter are at least twenty-five percent higher than the resonance frequency of the mass-spring system.

7. The system according to claim 2, wherein the predetermined damping frequencies are separated by at least ten Hertz.

8. An active inertial damper system for damping vibrations in a structure, the system comprising:
    a support frame configured for attachment to the structure to be damped;
    an inertial mass supported by the support frame via spring means to form a mass-spring system having a resonance frequency;
    a force actuator configured to apply a variable driving force between the inertial mass and the support frame;
    a vibration sensor configured to measure vibrations in the structure to be damped; and
    a controller configured to control the force actuator to adapt the variable driving force as a function of the measured vibrations for suppressing the measured vibrations in the structure,
    wherein the inertial mass is supported by the support frame via the spring means, wherein the spring means is the one or more primary springs and one or more support springs that are preloaded at a position of the inertial mass where the one or more primary springs are not loaded, wherein the one or more support springs are preloaded to at least partially counteract a gravity force on the inertial mass to alleviate a tension on the one or more primary springs.

9. The system according to claim 1, wherein the system comprises multiple damper devices, each damper device comprising a respective support frame, inertial mass, spring means, and force actuator, wherein the multiple damper devices are controlled by a central controller.

10. The system according to claim 1, wherein the support frame is connected to a building floor.

11. The system according to claim 1, wherein the support frame of the active inertial damper system is connected to a machine support frame for supporting a vibration sensitive machine, wherein the vibration sensitive machine is standing on the machine support frame supported by machine feet; wherein vibration sensors of the active inertial damper system are positioned at positions of the machine feet for damping vibrations at the machine feet.

12. The system according to claim 11, wherein the support frame of the active inertial damper system is attached to a bottom of the machine support frame below the vibration sensitive machine.

13. The system according to claim 1, wherein the support frame of the active inertial damper system is connected to a machine support frame for supporting a vibration sensitive machine, wherein the machine support frame is standing on a building floor, and wherein the machine support frame has a higher stiffness than the building floor.

14. A method of damping vibrations in a structure, the method comprising:
   providing a damping device comprising a support frame attached to the structure to be damped, an inertial mass supported by the support frame via spring means to form a mass-spring system having a resonance frequency; and a force actuator configured to apply a variable driving force between the inertial mass and the support frame;
   measuring vibrations in the structure to be damped; and
   controlling the damping device to adapt the variable driving force as a function of the measured vibrations using a filter determining a magnitude of the variable driving force as a function of frequency for suppressing the measured vibrations in the structure, wherein the filter provides increased magnitude of the driving force over a range of predetermined damping frequencies that are above the resonance frequency of the mass-spring system and further provides an anti-resonance dip in the magnitude of the variable driving force at the resonance frequency of the mass-spring system to suppress resonant behaviour of the mass-spring system itself.

15. The system according to claim 8, wherein the one or more primary springs are leaf springs and the one or more support springs are pressure springs.

16. The system according to claim 8, wherein the one or more primary springs have a combined first spring constant and the one or more support springs have a combined second spring constant, wherein the second spring constant is less than half the first spring constant.

17. The system according to claim 8, wherein the controller comprises a filter determining a magnitude of the variable driving force as a function of frequency for suppressing the measured vibrations in the structure.

18. The system according to claim 17, wherein the filter is configured to provide an anti-resonance dip in the magnitude of the variable driving force at the resonance frequency of the mass-spring system to suppress resonant behavior of the mass-spring system itself.

19. The system according to claim 18, wherein the filter is further configured to provide increased magnitude of the driving force over a range of predetermined damping frequencies that are above the resonance frequency of the mass-spring system.

20. The system according to claim 1, wherein the support frame has a base plate with a contact surface for attachment to the structure to be damped, wherein the inertial mass is supported relative to the base plate by the spring means there between.

* * * * *